United States Patent [19]

Dible et al.

[11] 4,425,654
[45] Jan. 10, 1984

[54] ULTRAVIOLET PREIONIZER FOR HIGH POWER LASER

[75] Inventors: William D. Dible, Verona; Cheug L. Chen, Pittsburgh, both of Pa.

[73] Assignee: The United States of America as represented by the Secretary of the Army, Washington, D.C.

[21] Appl. No.: 328,765

[22] Filed: Dec. 8, 1981

[51] Int. Cl.³ .............................................. H01S 3/097
[52] U.S. Cl. ........................................ 372/86; 372/87
[58] Field of Search ..................................... 372/86, 87

[56] References Cited

U.S. PATENT DOCUMENTS

| 3,893,045 | 7/1975 | Jacobson et al. | 331/94.5 G |
| 3,940,710 | 2/1976 | Lemay | 331/94.5 PE |
| 3,986,139 | 10/1976 | Meneely et al. | 331/94.5 P |
| 4,024,465 | 5/1977 | Farish et al. | 331/94.5 G |
| 4,056,789 | 11/1977 | Stregack et al. | 331/94.5 G |
| 4,068,192 | 1/1978 | Hintz et al. | 331/94.5 G |
| 4,228,408 | 10/1980 | Schimitschek et al. | 372/86 |
| 4,287,483 | 9/1981 | Rudko et al. | 372/86 |

OTHER PUBLICATIONS

U. K. Chatterjee et al., "An U-V Preionized Tea $CO_2$ Laser", *Indian J. Physics*, 50, 170–178 (1976).

Primary Examiner—James W. Davie
Attorney, Agent, or Firm—John H. Raubitschek; Arthur I. Spechler; Freddie M. Bush

[57] ABSTRACT

An ultraviolet preionizer for high power gas lasers. The preionizer is a spark gap array or groups of arrays adapted to be fired preceeding the main discharge pulse of the laser. A fast energy dump to the spark array results in efficient ultraviolet light production. The spark gaps of an array are automatically fired in sequence providing a series current path through the gaps to dump the energy, while providing an electrical glow discharge at each gap for ultraviolet emission.

4 Claims, 4 Drawing Figures

ULTRAVIOLET PREIONIZER FOR HIGH POWER LASER

DEDICATORY CLAUSE

The invention described herein was made in the course of or under a contract or subcontract thereunder with the Government and may be manufactured, used, and licensed by or for the Government for governmental purposes without the payment to us of any royalties thereon.

BACKGROUND OF THE INVENTION

In high power gas lasers excitation of the laser can be obtained utilizing an electrical discharge in the laser mixture. Ultraviolet preionization has proved to be effective in achieving pulsed stable electrical glow discharge in high pressure $CO_2$ laser mixtures. The ultraviolet provides initial electrons in the interelectrode space whereby volume ionization is possible in the presence of an applied electric field. The ultraviolet source for preionization in the laser mixture is generally provided by sparks of various design. In situations where there is no ultraviolet preionization the breakdown of the gas may procede by random cosmic ray event to provide electrons in a local region, or by electron emission at field enhancement sites of macroprotrusion on electrode surfaces. These forms of breakdown may easily lead to undesirable electron multiplication in a local region and development into arc channels. Ultraviolet preionization to provide a stable electrical glow discharge overcomes or reduces these problems.

SUMMARY OF THE INVENTION

An ultraviolet preionizer for high power gas lasers comprises a spark array or arrays which are fixed preceeding the main discharge pulse of the laser. The spark array, when initiated, provides an array of glow discharges in sequence. After the first gap of the array breaks down to provide a glow discharge, each subsequent gap is activated in sequence, with all of the gaps of an array providing a glow discharge before termination of the discharge pulse. This provides efficient ultraviolet light production for laser stimulation.

DESCRIPTION OF THE PREFERRED EMBODIMENT

Ultraviolet preionization is effective in achieving pulsed stable electrical glow discharges up to 10 microseconds in high pressure $CO_2$ laser mixtures. This is because the ultraviolet provides initial electrons in the interelectrode space whereby volume ionization can take place when an electric field is applied. The important objective of a spark board or spark gap array is to have the stored energy from a power source supplied to the spark gaps as fast as possible. Ultraviolet photons are proportional to the peak current through the spark. To achieve fast feeding of stored energy to the spark gap circuit, inductance must be minimized and at the same time a fast series discharge through the gaps must be provided. This is especially important for spark arrays used in large laser devices.

Figure 1:
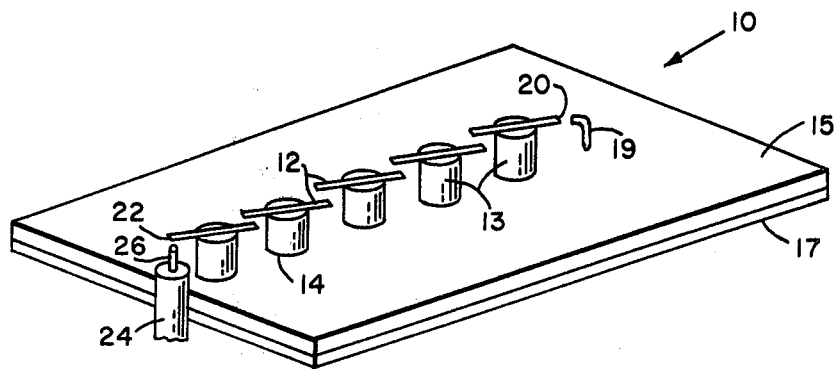
FIG. 1 is a diagrammatic drawing of a preferred embodiment of a spark gap array.
Figure 2:
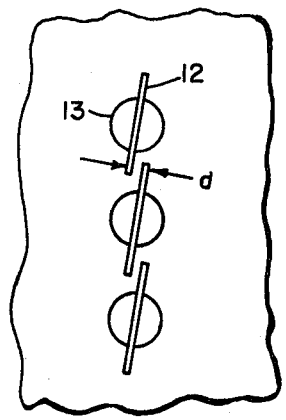
FIG. 2 is a top view of a spark gap array orientation.

Referring now to the drawings, FIG. 1 is a preferred embodiment of an ultraviolet preionizer spark gap array. The spark gap array 10 comprises a series of straight wire conductors 12, each conductor 12 being supported on a metal support post 13. The support posts 13 are mounted on a dielectric sheet 15 which is further attached to or supported by a metal ground plate 17. At one end of the array a metal bar or wire conductor 19 is adjacent wire end 20 and is connected to the ground plate 17. At the other end of the array at wire end 22 a coaxial conductor 24 is adapted for coupling input energy from a power source (not shown) through central conductor 26 to the array. As shown in FIG. 2 rotation of the posts 13 can bring the wires 12 from a position of overlapping contact (zero gap) to a maximum gap of separation. This gap between conductors 12 is designated d and is adjustable. Obviously the gap d must be some value greater than zero for an arc to be present when operating. The wires 12 are of substantially the same length and posts 13 are spaced at regular intervals, the distance between centers of adjacent posts 13 being less than the length of each wire 12 to allow the overlap of the respective wire ends. The wire 12 is spotwelded or soldered to post 13, which is then placed on a thin layer of insulating material. The dielectric supporting material or insulating material 15 may be a thin polycarbonate board and/or a polyimide resin. The ground plane may typically be copper, aluminum, or stainless steel plate.

In a simplified construction, the spark array components may comprise cylindrical posts with rounded off edges and fixed length wires spotwelded to the top of the post. Each post is then pushed into position in slots or recessions 14 drilled in the dielectric material. Typically the dielectric material may be the polycarbonate resin supporting the posts therein and having a layer of polymide resin separating it from the ground plane. The posts may be twisted in the recessions to adjust the spacing d to the desired value. As d is made less or approaches zero, the capacitance of the gap (Cg) becomes greater and the breakdown voltage required for Cg is less.

Figure 3:
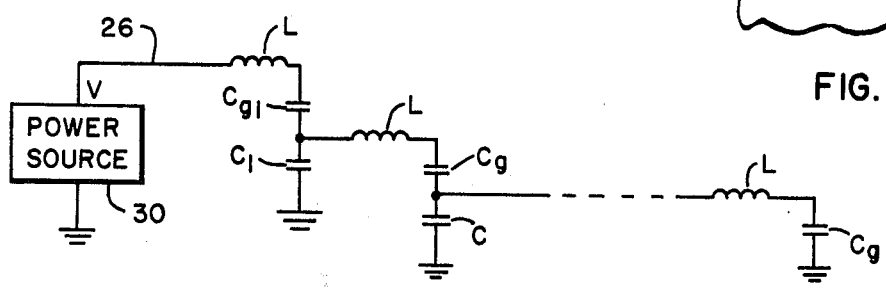
FIG. 3 is an equivalent electrical circuit of the spark gap array of FIG. 1 before application of a voltage pulse.

In the equivalent circuit of FIG. 3 a spark gap board is shown schematically in its inactive mode (before application of a voltage pulse). A voltage source 30 is shown coupled to provide a voltage through coaxial lead 26 to the board. The initial gap capacitance $Cg_1$ is encountered at the junction or gap between coaxial wire 26 and the first wire 12 and is in series with the capacitance $C_1$ formed between post 13 and ground plate 17. These series capacitors form a capacitive divider and the voltage across each capacitor is inversely proportional to its capacitance. When the voltage pulse of amplitude V is applied to the spark array the voltage is, therefore, initially divided between $Cg_1$ and $C_1$ in the ratio of $1/Cg_1$ and $1/C_1$. Since $C_1$ is larger to prevent breakdown and it is desired that $Cg_1$ have a breakdown voltage much less than the voltage V applied, $C_1$ is much greater than $Cg_1$. This applies for each capacitive section in the series. By having the voltage V much higher than the breakdown value of each gap capacitance Cg, the statistical lag in the sequential breakdown of the wire gaps is small.

Figure 4:
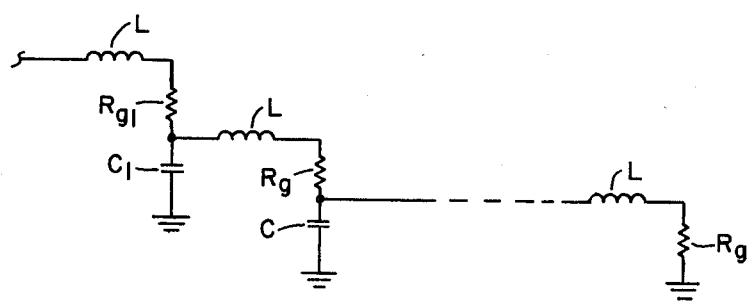
FIG. 4 is an equivalent circuit of the spark gap array after all gaps have been fired.

After the first gap $Cg_1$ breaks down, a glow discharge results across the gap and substantially all of the applied voltage appears across the following section (Cg and C) breaking down the wire gaps successively and rapidly until the current path is completed through post 19 to ground plate 17 and providing a glow discharge for ultraviolet emission. As each wire gap breaks down an arc resistance Rg is established for each spark gap. FIG. 4 is the equivalent circuit schematic showing a spark array after all of the gaps have been fired. After the voltage pulse V is reduced to the point where arc's cannot be sustained across the wire gaps the circuit of FIG. 3 is automatically restored and ready for a subsequent voltage pulse.

In a laser gas medium, when the voltage pulse is applied to the respective gaps, the time delay between the firing of each gap is governed by the RgC time constant of the preceding sections. The resistivity of most arc discharge is of the order of $10^{-2}$ ohms per centimeter. Therefore the RC time constant is of the order of $10^{-13}$ seconds. The ultraviolet production peaks shortly after the last wire gap breaks down. The controlling circuit element for the energy deposition rate to the wire gaps is the inductance L. The spark gap array provides a straight or near straight path and uniform spacing of glow discharge along the path. The ultraviolet preionizer provides a low circuit inductance and hence a fast current rise to produce ultraviolet light efficiently. The structure is simple, yet it can be precisely timed to achieve the proper Cg/C ratio simply by adjusting gap d.

As shown in FIG. 3, for each wire 12 there is an inductance L which comes from the finite length of the spark wire. Its value is usually extremely small and is considered neglegible. The diameter of each post 13 and the dielectric constant of and thickness of insulating material 15 all determine the value of the inherent capacitance C. Since the actual value of C is a function of these material parameters, construction of the array is readily adjusted, as is well established in the prior art, to provide a capacitance that will not break down for a desired voltage applied thereto. Thus the breakover voltage of the insulating material used in C is larger than the applied voltage from a power source 30 so that C does not break down. The wire 12 diameter and gap spacing d specify the value of gap capacitance Cg.

The spark array is fed by a voltage source via a coaxial cable as is well established in the art. Typically, a quick demountable coupling (not shown) can be provided for coupling the cable to the array. A negligible amount of inductance is added to the circuitry by the cable since the high voltage pulse may be carried by a variable length of coaxial cable from the power source to the array, depending on the distance of separation from the voltage source. Power sources are also well established and may typically involve a direct current charging voltage, a capacitance across the voltage and a triggered spark gap for initiating capacitive discharge through the load (array).

Although a particular embodiment and form of this invention has been illustrated, it is apparent that various modifications and embodiments of the invention may be made by those skilled in the art without departing from the scope and spirit of the foregoing disclosure. For example, a multiple series of spark arrays may be used. Each series of gaps is powered separately by a separate power source or charged capacitor with all sources triggered simultaneously. Accordingly, the scope of the invention should be limited only by the claims appended hereto.

We claim:

1. A spark array for providing ultraviolet preionization in a gas laser comprising: a plurality of spark gaps disposed in an array to provide a series connected current path therethrough during application of high voltage electrical energy thereto, said spark gaps comprise a plurality of conductor wires of substantially equal length, and each wire being supported on and electrically connected to a cylindrical metal post so that respective wire ends of intermediate wires are adjacent for providing respective spark gaps, and first and second conductive means for supplying a high voltage electrical energy across said spark gaps.

2. A spark array as set forth in claim 1 wherein said metal posts are equally spaced apart in at least one row for rotatably positioning adjacent wire ends to provide a variable air gap therebetween, and further comprising a metal ground plate and a dielectric supporting material, said dielectric supporting material lying on said metal ground plate and supporting said metal posts thereon, said ground plate being electrically connected to said second conductive means.

3. A spark array as set forth in claim 2 wherein said dielectric support material has recesses therein for supporting said posts in spaced apart alignment, said dielectric supporting material and each of said metal posts providing a capacitance between said posts and said ground plate, said capacitance having a breakover voltage greater than said high voltage electrical energy.

4. A spark array as set forth in claim 3 wherein each of said spark gaps provide a capacitance which is much less than the capacitance between said posts and said ground plates for providing a series-parallel capacitance circuit between said first and second conductive means prior to application of high voltage energy for providing a current path through said spark gaps when a predetermined voltage is supplied at said first conductive means and thereby initiating a series, sequential glow discharge of ultraviolet radiation from said gaps.

* * * * *